United States Patent [19]

Lidstrom

[11] Patent Number: 5,651,505
[45] Date of Patent: Jul. 29, 1997

[54] METHOD OF GRINDING CEMENT

[75] Inventor: Lars Lidstrom, Gustavsberg, Sweden

[73] Assignee: Cementa AB, Danderyd, Sweden

[21] Appl. No.: 446,731
[22] PCT Filed: Dec. 3, 1993
[86] PCT No.: PCT/SE93/01049
 § 371 Date: Oct. 16, 1995
 § 102(e) Date: Oct. 16, 1995
[87] PCT Pub. No.: WO94/13596
 PCT Pub. Date: Jun. 23, 1994

[30] Foreign Application Priority Data

Apr. 12, 1992 [SE] Sweden .................. 9203653

[51] Int. Cl.$^6$ .................................. B02C 17/16
[52] U.S. Cl. ................ 241/16; 241/21; 241/24.1; 241/184
[58] Field of Search ................ 241/184, 30, 24.1, 241/16, 21

[56] References Cited

FOREIGN PATENT DOCUMENTS 0 267 170  11/1988  European Pat. Off. .
1 160 569   8/1969  United Kingdom .

*Primary Examiner*—Mark Rosenbaum
*Attorney, Agent, or Firm*—Oblon, Spivak, McClelland, Maier & Neustadt, P.C.

[57] ABSTRACT

A method of continued grinding of cement is disclosed in order to obtain cement with a high specific surface and/or a steep grain size distribution curve. The grinding is performed in a mill with agitated grinding medium from a specific surface of 300-400 $m^2/kg$ (Blaine) to a specific surface of up to 1,200 $m^2/kg$ (Blaine) and with a particle size distribution such that about 80% of the particles pass a sieve opening with a size up to about 25 microns, using grinding bodies with an average size within the interval of 2 to 15 mm.

10 Claims, 1 Drawing Sheet

METHOD OF GRINDING CEMENT

TECHNICAL FIELD

The present invention relates to a method of grinding cement, and more specifically a method of grinding cement manufactured in conventional grinding systems on an industrial scale in order to produce special qualities with a larger specific surface and/or with a steeper particle size distribution curve than what is economically feasable with conventional technique.

PRIOR ART

The manufacture of special qualities of cement with a larger specific surface compared with cement of standard quality is normally accomplished through longer residence times and a larger recirculation ratio for not completely ground goods in the same type of grinding systems that are used for the manufacture of standard cement.

When grinding in a rotating drum, see for instance GB-A-1 160 569, the movement of the grinding bodies is achieved within the mill by the friction against a casing provided with lifters. The rotational speed of the mill is determined by the so called critical velocity at which the peripheral speed becomes so high that the centrifugal force on the grinding bodies exceeds the gravity. The diameter has a great influence on the capacity, but it has to be limited when using small balls, which in turn is necessary for the fine grinding. Then the length has to be increased instead, which might be disadvantageous at grinding to extreme fineness, such as a low energy efficiency.

The conventional grinding systems are best suited for grinding cement to a specific area of 300–400 $m^2$/kg (Blaine), i.e. down to a $k_{80}$ of about 30–40 μm. The factor $k_{80}$ is defined as the sieve opening through which 80% by weight of the goods passes. At a grinding driven further the energy consumption increases heavily and because of the increasingly less efficient use of energy it becomes disadvantageous to use this system. Hereby a relatively flattened particle size distribution curve is obtained, which is undesirable. Moreover it has become evident that the mineral components or additives that are most easily ground are recovered in the finest fractions.

It is well known that under similar conditions cement hardens quicker when the specific surface of the ground cement clinker and the hydraulic additives becomes larger.

The finest fraction usually have a higher content of e.g. gypsum, tricalcium silicate and alkali since these are more easily ground than the other clinker constituents, Moreover, one has to count With the fact that the finest fractions react to a larger extent with the atmospheric humidity and carbon dioxide in the air which is present at the grinding compared with the coarser fractions.

It has also been shown that substantially bigger increases of the pressure resistance can be obtained if, with the same specific surface, the particle size distribution curve is made steeper, i.e. with a relatively narrow distribution. This means that $k_{80}$ with the same specific surface decreases slightly and in relation to the steeper inclination.

The hardening of the cement mortar follows the reaction of the cement with water. This is the reason why the grain size of the cement is of great importance. A finely ground cement grain gives a large contact surface to the water, which means that the reactions start quickly. Since the reaction penetrates to the same depth in all grains irrespective of their sizes the not hydrated part becomes comparatively smaller in finer cement particles compared to in coarser particles.

Investigations performed by the inventor clearly show that in fine grinding of mineral products it is not only the physical courses connected to mechanical degradation that occur. The structure of the material, the surface characteristics and the reactivity are changed too and in certain cases chemical reactions occur because of the great energy input at the grinding, both when it takes place in a wet and in a dry environment. The changes increase with the further fine-grinding and dry-grinding gives larger changes than wet grinding. However it should be mentioned that these effects from a more extreme fine grinding diminishes through the reaction with moisture in the surrounding air if a substantial time passes between grinding and cement hardening.

The large amounts of energy which are added to the cement minerals at an effective fine grinding results, besides formation of new surfaces and particles, in a layer with a disrupted lattice wherein the density of microcracks is such that solubility and reactivity increases substantially and much more than can be explained by the sizes of the individual gains. These phenomenons can be observed with different measuring methods, such as differential thermo analysis, X-ray analysis or nuclear magnetic resonance.

THE INVENTION

The object of the present invention is to provide a new and advantageous method of continued grinding of cement, whereby the above mentioned disadvantages, in conventional fine-grinding of cement are avoided at least to a substantial extent and wherein the advantages of fine-grinding are utilized to a substantial extent.

In order to achieve this object it is suggested according to the invention that in a fine grinding method the continued grinding is performed in a mill with agitated grinding medium to a particle size of the further ground product less than $k_{80}$=25 μm with the use of grinding bodies with an average size within the interval 2–15 mm, depending on the degree of grinding. With this grinding method with comparatively small grinding bodies, with a rather small energy input, an effective, mainly against the coarse part of the product directed grinding action, is obtained so that a substantially optimal, steep grain size distribution curve is obtained for a desired cement quality.

With small grinding bodies the number of contact locations between the bodies increases very much and this adds to a very effective and comparatively energy efficient grinding.

The invention makes use of the practical advantages which reside in using existing cement grinding systems down to the commercially available cement qualities. The fine grinding can subsequently advantageously be performed in a system directly adapted to this fine-grinding and can also be performed directly in connection with the final use of the cement. This gives the opportunity of a special conformation of grain size and/or specific surface for the intended fields of use.

In agitated mills the supply of energy per unit of volume of the grinding space compared to conventional rotating mills is very high, which has a special meaning when grinding abrasive material, since it makes possible the use of abrasive materials resistant to wear without that the cost of these limits their use.

In the method according to the invention the grinding bodies can of course be made of metallic or ceramic material, but from a reactional point of view the use of grinding bodies made of autogenous material cannot be excluded, e.g. a selected fraction of cement clinker or of a material rich in silicium, which in abraded condition cannot affect the hardening reaction of the finely ground cement in a negative way.

The goods transport through an agitated mill at wet grinding takes place through pumping up through the mill and at dry grinding through gravity flow through the mill. The flow of goods controlled in this way adds to the effective grinding down in such a way that the goods have to pass a bed of comparatively fine grinding bodies, which statistically means that coarser particles are exposed to a bigger grinding effect than finer particles. This grinding principle can thus also be characterized as containing a built-in dynamic classification function. This cooperates to give a steeper grain size distribution curve compared to what conventionally working mills within this particle size interval can give.

This classification effect can however in certain cases be insufficient for obtaining the desired slope of the screening curve when starting with standard cement, which has a rather flattened curve. This means that an external classification equipment might be needed. For dry-grinding this means an air classifier and for wet-grinding a hydrocyclone.

The fine-grinding of cement can be performed in a dry or wet environment. When practising the invention for the manufacture of finely ground cement in a dry environment for different purposes of use the grinding system can be complemented with a classification equipment. Thereby this performs two functions, partly it makes possible a separation of fine and ready ground particles, partly it can cooperate to lower the temperature in the grinding system with the air which is used for the classification.

When using the invention in the manufacturing in a dry environment the fine grinding can take place in direct connection with its use.

When practising the invention the fine-grinding can also take place directly in connection with its use in a wet environment, e.g. injection cement for injecting purposes. The short residence time in the mill is no obstacle from a reaction point of view. At an extreme fine-grinding—if this can be necessary—a classification can be done here too.

BRIEF DESCRIPTION OF THE DRAWINGS

The drawing schematically illustrates a plant for practicing the method of the invention.

DETAILED DESCRIPTION OF EMBODIMENTS

Figure 1:
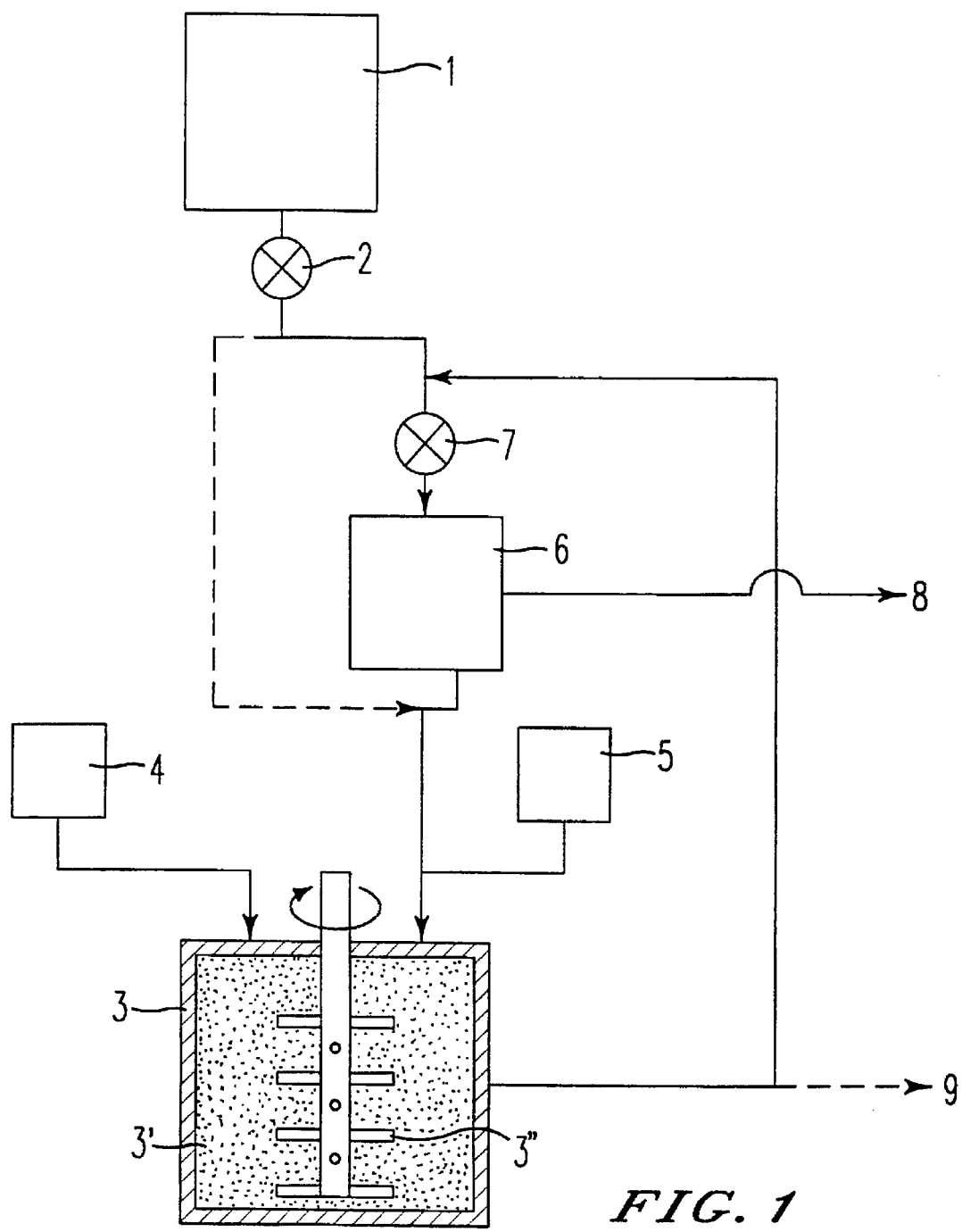

The invention will be described below with reference to the accompanying drawing, which schematically illustrates an embodiment of a plant for practising of the method according to the invention, chosen as an example.

In the drawing, 1 is a hopper for standard cement, which with a feeder 2 controls the addition of cement to the agitated mill 3. The feeder is suitably a screw feeder or gate feeder in dry grinding and a pump in wet grinding. The mill 3 can have a speed control for further optimizing the grinding parameters. Grinding bodies are added through a hopper 4.

Depending on the demand of the fineness and optional action on the reaction, the grinding bodies may have different sizes and may be made of different materials. These choises are based on an economical judgement, where the cost of the wear is put up against an increased grinding efficiency.

In order to obtain the desired product fineness of the product at the grinding, and in order to simultaneously obtain a certain enhancement of the grinding efficiency, grinding aids in the form of dispersion agents are added with means designated with 5. When grinding to specific surfaces above 300–350 m$^2$/kg (Blaine) grinding aids e.g. of the type glycol or ethanolamine have to be added in proportion to increased fineness of the ground cement.

The cement is thus fed to the mill 3 with agitated grinding medium, in this application a mill in which the grinding effect is obtained with grinding bodies shown at 3' and in which the cement material being ground is agitated with an agitator 3" moving with high velocity. The grinding effect is thus achieved by pressure and shear forces between grinding bodies and cement, which forces are generated by said agitator, which normally rotates with about 80 r.p.m. and which emits a high effect per unit volume of the mill, usually in the order of at least 10 times the effect consumed per mill unit volume at a conventional ball mill.

The mill 3 works with rather small grinding bodies, e.g. with a mean size of 2–10 mm, and with a reasonable residence time therein of the added cement it gives rise to the desired grinding thereof to a grain size less than $k_{80}=25$ µm, such as $k_{80}=15$ µm, or $k_{80}=10$ µm, e.g. between $k_{80}=4$ µm and $k_{80}=8$ µm and with 100% by weight having a size less than 15–30 µm.

The grinding is combined in a suitable way with a classification equipment 6 with feeding means 7, wherein the final product 8 is separated and the coarse fraction is transferred to the mill for regrinding. The classifier shall be able to give the required separation sharpness so that the desired particle size distribution can be obtained.

These units can advantageously be made with very small production capacities, whereby also mobile or semimobile plants are conceivable.

In dry grinding to a product with a not too high fineness it is probably not necessary to have a classification. This method is shown with a dashed line 9, whereby the finely ground product is manufactured solely through grinding without return of oversized grains from the classifier.

In order to further illustrate the invention grinding with a conventional drum and according to the invention, respectively, are discussed in the form of an embodiment.

EXAMPLE—drum mill

With grinding bodies of the size stated in GB-A-1 160 569 up to 6 g a realistic maximum diameter for a rotating mill is about 3.5 m. This means that the casing velocity will be about 2.5 m/s. This velocity, which is the velocity of the outmost layer of grinding bodies, shall then be transferred to the inner layer of balls by the friction between the balls, whereby the balls closest to the center will have a very low velocity, in the order of 0.2–0.3 m/s, and thereby a low grinding efficiency.

Assuming a ball size of 8 mm, which with a normal charge will give an average diameter of about 5 mm, gives about 2 000 balls·dm$^3$ grinding charge. With a density of the balls of 7.6 kg/dm$^3$ the bulk density will be about 3.7 kg/dm$^3$ and the number of balls will be about 7400/dm$^3$. If the layer of balls is, for example, 0.25×3.5=0.9 m thick, this means that there are at least 170 layers of balls which shall have their active grinding movement transferred from the moving effect of the casing on the outmost layers of balls. From this it is also evident that the best working area of the rotating ball mills with such a size of the grinding bodies are that, where the number of layers of grinding bodies not becomes so great that the movements of the casing cannot be transferred in a meaningfull way.

The capacity of a rotating drum mill follows the equation:

$$P_{effect} = D^{2.6} \times L_{length}$$

From this follows that if small balls shall be used in a drum mill the possibility of using the strongly capacity increasing factor of the diameter is reduced and instead a greater length has to be selected. A greater length can give drawbacks in extreme fine grinding since the transport through the mill takes place through gravity flow and thereby there is a risk of a low energy use.

In a rotating mill about 100 kg balls per kW motor effect are used.

EXAMPLE—agitating mill

In an agitating mill the grinding effect is obtained with the aid of the rotor being provided with a great number of rods which give the grinding bodies the movement necessary for the grinding. The peripheral velocity of the rods is 2.5 m/s and the velocity inwardly at the rotor shaft is 1.5 m/s. The average velocity becomes about 2.0 m/s. Each rod with a volume of 0.7 dm$^3$ shall on the average take care of the movement of about 8 of dm$^3$ balls.

The whole ball charge is thus put into motion with an average velocity of 2.0 m/s and the effective supply of energy results in that in the agitating mill only about 30 kg balls per kW motor effect are required.

The grinding energy is thus transferred substantially more efficient in an agitating mill compared with a rotating mill under the corresponding conditions. This leads to a lower grinding product temperature and can also be red from the fact that the agitating mill only needs one fourth of the amount of balls which is required for the same effect of a rotating mill.

With a direct grinding comparison between agitating and rotating mill it was shown that the agitating mill only requires one fifth of the amount of energy, which is demanded by the rotating mill in order to achieve a similar grinding.

The invention is not limited to the above described method and the embodiment shown in the drawing but instead it can be realized in an optional way within the scope of the following claims.

I claim:

1. Method of grinding cement, comprising the steps of:

providing a grinding medium comprising grinding bodies with an average size within the interval of 2 to 15 mm into an agitating mill, and grinding the cement in said agitating mill with said grinding medium to provide ground cement particles, wherein the cement is ground from a specific surface of 300–400 m$^2$/kg (Blaine) to a specific surface of up to 1 200 m$^2$/kg (Blaine), and wherein the ground cement particles have a particle size distribution such that about 80% of the particles pass a sieve opening with a size up to about 25 µm.

2. Method according to claim 1, characterized in that the grinding is performed to a particle size distribution such that 80% of the particles pass a sieve opening having a size of up to about 15 µm.

3. Method according to claim 1, characterized in that the grinding is performed to a particle size distribution such that 80% of the particles pass a sieve opening having a size of up to about 10 µm.

4. Method according to claim 1, characterized in that the grinding is performed to a particle size distribution such that 80% of the particles pass a sieve opening having a size of up to about 4–8 µm.

5. Method according to claim 1, characterized in that the grinding is performed in a dry environment.

6. Method according to claim 1, characterized in that the grinding is performed in a wet environment.

7. Method according to claims 1, characterized in that grinding additives in the form of dispersion agents are added for obtaining of specific surfaces exceeding 300–350 m$^2$/kg (Blaine).

8. The method of claim 7, wherein the grinding additive is glycol or ethanolamine.

9. Method according to claim 1, characterized in that the continued grinding is performed in direct connection with use in order to maintain the reactivity obtained in the grinding.

10. Method according to claim 1, characterized in that the ground cement is classified subsequent to the grinding in a classification equipment.

* * * * *